(12) United States Patent
Radhakrishnan et al.

(10) Patent No.: US 7,284,117 B1
(45) Date of Patent: Oct. 16, 2007

(54) PROCESSOR THAT PREDICTS FLOATING POINT INSTRUCTION LATENCY BASED ON PREDICTED PRECISION

(75) Inventors: Arun Radhakrishnan, Austin, TX (US); Kelvin D. Goveas, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 426 days.

(21) Appl. No.: 10/700,391

(22) Filed: Nov. 4, 2003

(51) Int. Cl.
  G06F 7/38 (2006.01)
  G06F 9/00 (2006.01)
  G06F 9/44 (2006.01)
  G06F 15/00 (2006.01)

(52) U.S. Cl. ..................... 712/222; 712/221

(58) Field of Classification Search ................. 712/222
See application file for complete search history.

(56) References Cited

U.S. PATENT DOCUMENTS

| | | | |
|---|---|---|---|
| 5,631,859 A * | 5/1997 | Markstein et al. .......... 708/513 |
| 5,802,386 A * | 9/1998 | Kahle et al. ................. 712/23 |
| 5,842,036 A * | 11/1998 | Hinton et al. ................ 712/23 |
| 6,029,243 A * | 2/2000 | Pontius et al. .............. 712/222 |
| 6,542,984 B1 | 4/2003 | Keller et al. |
| 2003/0061467 A1 | 3/2003 | Yeh et al. |
| 2003/0126406 A1* | 7/2003 | Hammarlund et al. ...... 712/200 |

OTHER PUBLICATIONS

Trace Cache by Rotenberg, Bennett and Smith.*

* cited by examiner

*Primary Examiner*—Eddie Chan
*Assistant Examiner*—Brian P Johnson
(74) *Attorney, Agent, or Firm*—Lawrence J. Merkel; Meyertons, Hood, Kivlin, Kowert & Goetzel, P.C.

(57) ABSTRACT

A processor includes a prediction circuit and a floating point unit. The prediction circuit is configured to predict an execution latency of a floating point operation. The floating point unit is coupled to receive the floating point operation for execution, and is configured to detect a misprediction of the execution latency. In some embodiments, an exception may be taken in response to the misprediction. In other embodiments, the floating point operation may be rescheduled with the corrected execution latency.

24 Claims, 6 Drawing Sheets

US 7,284,117 B1

PROCESSOR THAT PREDICTS FLOATING POINT INSTRUCTION LATENCY BASED ON PREDICTED PRECISION

BACKGROUND OF THE INVENTION

1. Field of the Invention

This invention is related to the field of processors and, more particularly, to instruction execution latencies.

2. Description of the Related Art

Processors typically implement instructions which operate on various data types. For example, integer instructions operate on integer data, while floating point instructions operate on floating point data. Generally, floating point data is represented by a sign, a significand (or mantissa), and an exponent. The base for the floating point data may be raised to the exponent power and multiplied by the significand to generate the numerical value represented by the floating point data. Most processors implement the floating point specification promulgated by the Institute for Electrical and Electronic Engineers (IEEE), as specified by IEEE standard 754, etc.

In some cases, the execution hardware implemented by the floating point unit may have a variable execution latency for certain floating point instructions. That is, the execution latency of the instruction is not fixed. This may be problematic if other hardware in the processor is dependent on the execution latency. For example, scheduling hardware may be dependent on the execution latency for selecting when dependent instructions may be scheduled. A mechanism for handling floating point instructions which do not have a fixed execution latency is desired.

SUMMARY OF THE INVENTION

In one embodiment, a processor includes a prediction circuit and a floating point unit. The prediction circuit is configured to predict an execution latency of a floating point operation. The floating point unit is coupled to receive the floating point operation for execution, and is configured to detect a misprediction of the execution latency. In some embodiments, an exception may be taken in response to the misprediction. In other embodiments, the floating point operation may be rescheduled with the corrected execution latency.

BRIEF DESCRIPTION OF THE DRAWINGS

The following detailed description makes reference to the accompanying drawings, which are now briefly described.

Figure 1:
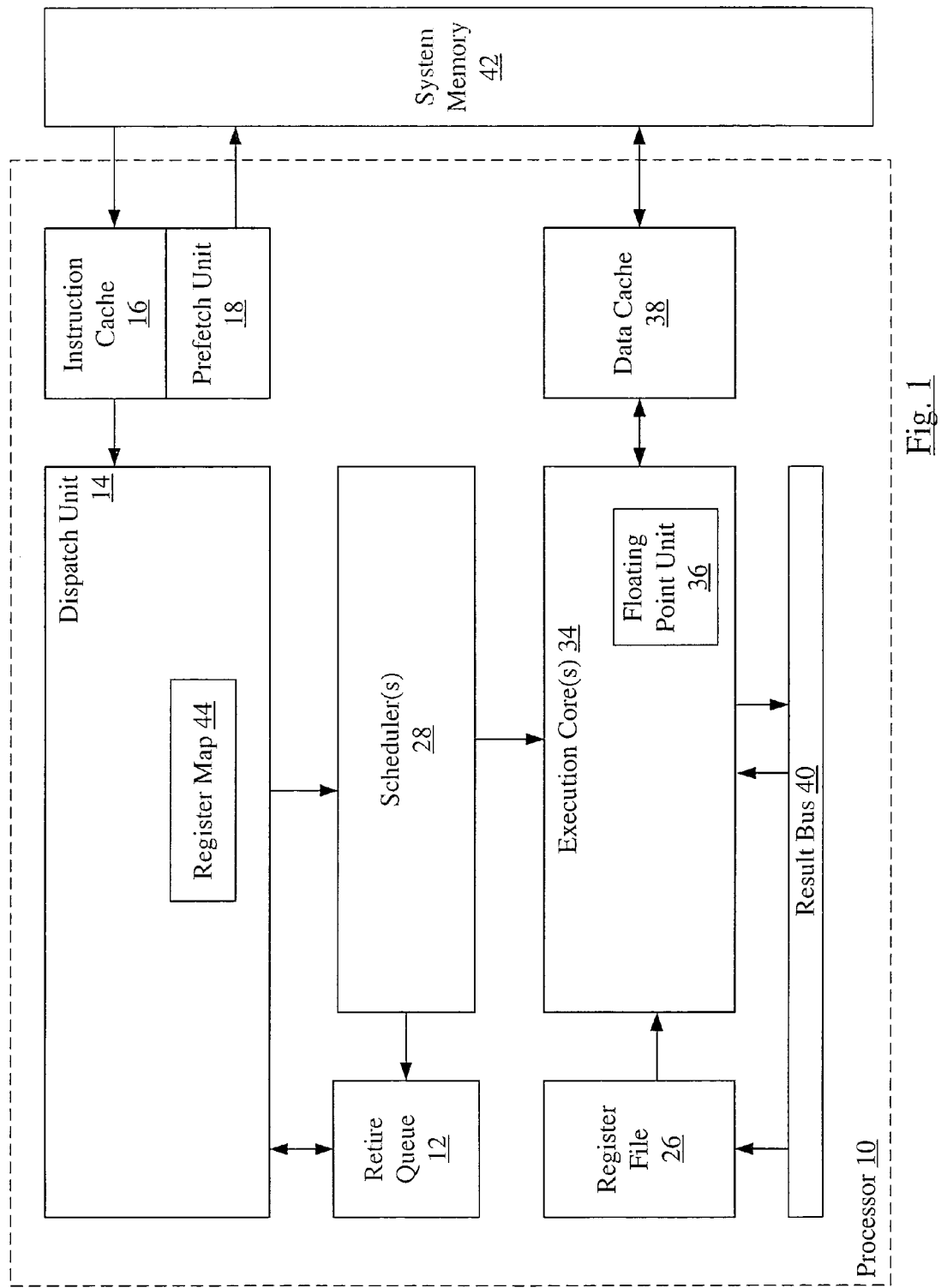
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Processor Overview

FIG. 1 is a block diagram of one embodiment of a processor 10. The processor 10 is configured to execute instructions stored in a system memory 42. Many of these instructions operate on data stored in the system memory 42. It is noted that the system memory 42 may be physically distributed throughout a computer system and/or may be accessed by one or more processors 10.

In the illustrated embodiment, the processor 10 may include an instruction cache 16 and a data cache 38. The processor 10 may include a prefetch unit 18 coupled to the instruction cache 16. A dispatch unit 14 may be configured to receive instructions from the instruction cache 16 and to dispatch operations to the scheduler(s) 28. One or more of the schedulers 28 may be coupled to receive dispatched operations from the dispatch unit 14 and to issue operations to the one or more execution cores 34. The execution core(s) 34 may include one or more integer units, one or more floating point units (e.g. a floating point unit 36 illustrated in FIG. 1), and one or more load/store units. Results generated by the execution core(s) 34 may be output to a result bus 40. These results may be used as operand values for subsequently issued instructions and/or stored to the register file 26. A retire queue 12 may be coupled to the scheduler(s) 28 and the dispatch unit 14. The retire queue 12 may be configured to determine when each issued operation may be retired. In one embodiment, the processor 10 may be designed to be compatible with the x86 architecture (also known as the Intel Architecture-32, or IA-32). Note that the processor 10 may also include many other components. For example, the processor 10 may include a branch prediction unit (not shown).

The instruction cache 16 may store instructions for fetch by the dispatch unit 14. Instruction code may be provided to the instruction cache 16 for storage by prefetching code from the system memory 42 through the prefetch unit 18. Instruction cache 16 may be implemented in various configurations (e.g., set-associative, fully-associative, or direct-mapped).

The prefetch unit 18 may prefetch instruction code from the system memory 42 for storage within the instruction cache 16. The prefetch unit 18 may employ a variety of specific code prefetching techniques and algorithms.

The dispatch unit 14 may output operations executable by the execution core(s) 34 as well as operand address information, immediate data and/or displacement data. In some embodiments, the dispatch unit 14 may include decoding circuitry (not shown) for decoding certain instructions into operations executable within the execution core(s) 34. Simple instructions may correspond to a single operation. In some embodiments, more complex instructions may correspond to multiple operations. Upon decode of an operation that involves the update of a register, a register location within register file 26 may be reserved to store speculative register states (in an alternative embodiment, a reorder buffer may be used to store one or more speculative register states for each register and the register file 26 may store a committed register state for each register). A register map 44 may translate logical register names of source and destination operands to physical register names in order to facilitate register renaming. The register map 44 may track which registers within the register file 26 are currently allocated and unallocated.

The processor 10 of FIG. 1 may support out of order execution. The retire queue 12 may keep track of the original program sequence for register read and write operations, allow for speculative instruction execution and branch misprediction recovery, and facilitate precise exceptions. In some embodiments, the retire queue 12 may also support register renaming by providing data value storage for speculative register states (e.g. similar to a reorder buffer). In other embodiments, the retire queue 12 may function similarly to a reorder buffer but may not provide any data value storage. As operations are retired, the retire queue 12 may deallocate registers in the register file 26 that are no longer needed to store speculative register states and provide signals to the register map 44 indicating which registers are currently free. By maintaining speculative register states within the register file 26 (or, in alternative embodiments, within a reorder buffer) until the operations that generated those states are validated, the results of speculatively-executed operations along a mispredicted path may be invalidated in the register file 26 if a branch prediction is incorrect.

The register map 44 may assign a physical register to a particular logical register (e.g. architected register or microarchitecturally specified registers) specified as a destination operand for an operation. The dispatch unit 14 may determine that the register file 26 has one or more previously allocated physical registers assigned to a logical register specified as a source operand in a given operation. The register map 44 may provide a tag for the physical register most recently assigned to that logical register. This tag may be used to access the operand's data value in the register file 26 or to receive the data value via result forwarding on the result bus 40. If the operand corresponds to a memory location, the operand value may be provided on the result bus (for result forwarding and/or storage in the register file 28) through a load/store unit (not shown). Operand data values may be provided to the execution core(s) 34 when the operation is issued by one of the scheduler(s) 28. Note that in alternative embodiments, operand values may be provided to a corresponding scheduler 28 when an operation is dispatched (instead of being provided to a corresponding execution core 34 when the operation is issued).

As used herein, a scheduler is a device that detects when operations are ready for execution and issues ready operations to one or more execution units. For example, a reservation station may be one type of scheduler. Independent reservation stations per execution core may be provided, or a central reservation station from which operations are issued may be provided. In other embodiments, a central scheduler which retains the operations until retirement may be used. Each scheduler 28 may be capable of holding operation information (e.g., the operation as well as operand values, operand tags, and/or immediate data) for several pending operations awaiting issue to an execution core 34. In some embodiments, each scheduler 28 may not provide operand value storage. Instead, each scheduler may monitor issued operations and results available in the register file 26 in order to determine when operand values will be available to be read by the execution core(s) 34 (from the register file 26 or the result bus 40).

The floating point units (e.g. the floating point unit 36) may be configured to perform floating point operations. One or more of the floating point units 36 may include a multiplier for performing multiply operations.

Floating Point Operation Scheduling and Execution

Floating point operation scheduling and execution will next be discussed in more detail with reference to FIGS. 2-4. Generally, a floating point operation may include any operation executable by a floating point unit such as the floating point unit 36 (e.g. operations defined to operate on floating point data). A floating point operation may be directly mapped from a floating point instruction (e.g. instructions defined in the x87 instruction set that is part of the IA-32 architecture, as well as other floating point instructions such as streaming single instruction-multiple data (SIMD) extension (SSE) instructions, 3D-NOW instructions, etc.). A floating point operation may also be a portion of a floating point instruction (e.g. a floating point instruction that has a memory operand may be decoded into a floating point operation and a load (and/or store) operation).

Figure 2:
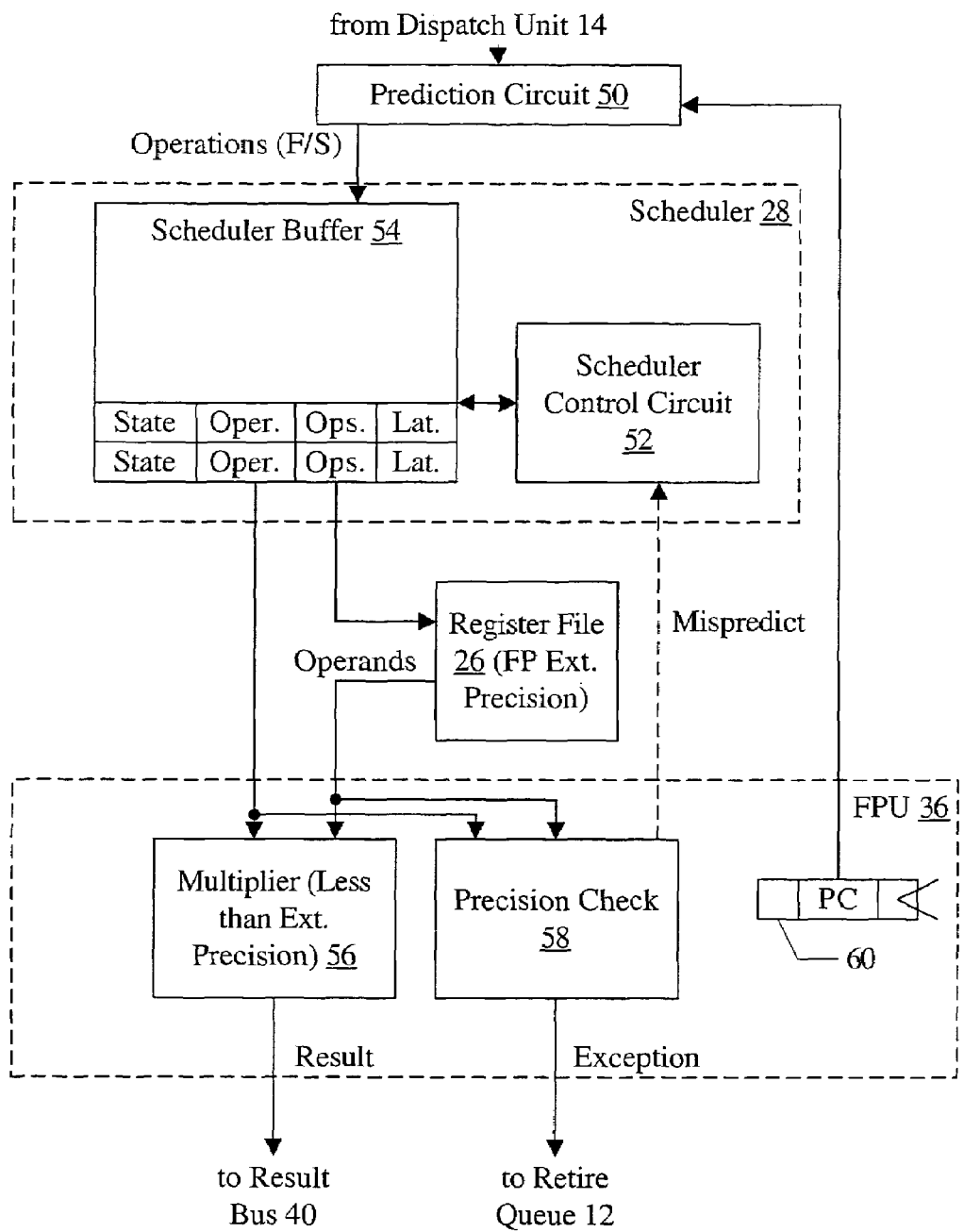
FIG. 2 is a block diagram illustrating a portion of one embodiment of the processor in more detail.

Turning now to FIG. 2, a block diagram illustrating one embodiment of the scheduler 28, the register file 26, and the floating point unit (FPU) 36 in greater detail is shown. The scheduler 28 is coupled to receive one or more operations from the dispatch unit 14. Additionally, a prediction circuit 50 is shown. The prediction circuit 50 is coupled to receive the operations, or at least an indication of one or more floating point operations included in the operations, and is configured to provide an indication of whether the floating point operations are predicted to be "fast" floating point operations or "slow" floating point operations (as described in more detail below). The indication is illustrated in FIG. 2 as a fast/slow (F/S) indication from the prediction circuit 50 to the scheduler 28. The scheduler 28 further includes a scheduler buffer 54 coupled to the scheduler control circuit 52 and further coupled to receive the operations from the dispatch unit 14. The scheduler buffer 54 is coupled to convey a floating point operation to the FPU 36, and operand addresses to the register file 26. The register file 26 is configured to convey operands to the FPU 36 in response to the operand addresses. The FPU 36 includes a multiplier 56, a precision check circuit 58, and a control register 60. In the illustrated embodiment, both the multiplier 56 and the precision check circuit 58 are coupled to receive the floating point operation and the operands. The multiplier 56 is coupled to provide a result on the result bus 40. In the illustrated embodiment, the precision check circuit 58 is configured to signal an exception to the retire queue 12. Alternatively or in addition, the precision check circuit 58 may signal a misprediction to the scheduler control circuit 52. The control register 60 includes a precision control field (PC), which the prediction circuit 50 is coupled to receive.

At least some floating point operations may have different execution latencies. For example, the execution latency of a given floating point operation may be dependent on the operand data for the floating point operation. Particularly, the execution latency may be dependent on the precision of the operands, for the present embodiment. An example using the floating point multiply operation is presented, but may generally be applied to any floating point operation. As used herein, the "execution latency" of a floating point operation includes at least the time period (e.g. number of clock cycles of the clock employed by the processor 10) occupied by the operation in the FPU 36 during execution. The execution latency may further include additional time periods in other pipeline stages (e.g. pipeline stages between the scheduler 28 and the FPU 36, such as pipeline stages to arbitrate for the register file 26 and read the register file 26, in some embodiments).

In the present embodiment, floating point data may exist in one of at least three precisions: single precision, double precision, and extended precision. Single precision floating point data may comprise one sign bit, 8 exponent bits, and 24 significand bits. A 32 bit value may represent the single precision floating point data, where the 32 bits comprise the sign and exponent bits as well as the significand bits, except for the binary zero or one to the left of the significand's binary point (which may be inferred from the exponent). Double precision floating point data may comprise one sign bit, 11 exponent bits, and 53 significand bits. A 64 bit value may represent the double precision data, where the 64 bits include the sign and exponent bits and the significand bits except for the binary one or zero to the left of the binary point, which again may be inferred from the exponent. Extended precision floating point data may be represented by an 80 bit value comprising one sign bit, 15 exponent bits, and 64 significand bits. As illustrated in FIG. 2, the register file 26 may store floating point data in extended precision. That is, even if the floating point data is single or double precision, the floating point data is stored in the register in the extended precision format. A single precision value stored in the register file 26 may have the least significant 40 bits of the extended-precision significand equal to zero. Similarly, a double precision value stored in the register file 26 may have the least significant 11 bits of the extended-precision significand equal to zero. In some embodiments, the register file 26 may store an internal precision that includes additional significand bits. In such embodiments, additional least significant bits of the internal-precision significand may be zero for single or double precision values. As used herein, the term "precision" refers to the number of bits used to represent the floating point value. A higher precision may be more exact than a lower precision for a given calculation.

The FPU 36 may include hardware that is designed for a lower precision than the maximum precision of the processor 10 (e.g. the extended precision or internal precision). For example, in the illustrated embodiment, the multiplier 56 may be designed for less than the extended precision. In some embodiments, the multiplier 56 may be designed to multiply a 64 bit multiplier significand by a 53 bit multiplicand significand (i.e. an extended precision multiplier significand by a double precision multiplicand significand). In such an embodiment, single and double precision operands (or a single precision operand and a double precision operand) may be multiplied in a single pass through the multiplier 56. Extended precision operands may be multiplied in two passes (where each pass generates a partial product for different portions of the multiplicand and the partial products may be added together). In other embodiments, the multiplier 56 may be designed to multiply an internal precision (e.g. 68 bit, in one implementation) multiplier by a double precision multiplicand. In still other embodiments, the multiplier 56 may be designed to multiply two double precision operands. In such embodiments, single and double precision operands may be completed in a single pass through the multiplier 56 and extended precision operands may be completed in four passes (each pass generating a partial product for different portions of the multiplicand and multiplier and the partial products may be added together). Through examining commonly used floating point code, the inventors discovered that extended precision was used infrequently, while the double and single precision were used frequently. Thus, designing a multiplier 56 that handles the single and double precision in a single pass but uses more passes for the extended precision may provide high performance for the common cases and may correctly handle the less common cases. Designing the multiplier for the lower precision may ease the task of implementing the multiplier at higher clock frequencies for the processor 10.

Accordingly, floating point multiply operations may have different execution latencies dependent on the operand precision for the illustrated embodiment. The prediction circuit 50 may predict the operand precision for floating point multiply operands supplied to the scheduler 28. The scheduler 28 may schedule the floating point multiply operations using the predicted execution latency, and the FPU 36 may detect a misprediction of the execution latency. The FPU 36 may detect a misprediction if the predicted execution latency is less than the actual execution latency. If the predicted execution latency is greater than the actual execution latency, the FPU 36 may delay the result of the floating point multiply operation until the predicted execution latency expires, and then transmit the result on the result bus 40. In some embodiments, a misprediction may also be detected if the predicted execution latency is greater than the actual execution latency. For example, detecting such a misprediction may permit the predicted execution latency for the floating point multiply operation to be modified for subsequent executions of the floating point multiply operation. In other embodiments, a misprediction may not be detected if the predicted execution latency is greater than the actual execution latency.

The precision control field (PC) of the control register 60 may control the output precision of certain floating point operations, and may be programmed to indicate any desired precision (e.g. single, double, or extended). That is, the PC field may specify the precision to which the result of the floating point operations are to be rounded. However, the operations may be carried out to the precision of the operands (even if the precision of the operands is greater than the precision indicated by the PC field). In some embodiments, the FPU 36 may be designed to execute floating point operations specified in the floating point expansion to the x86 instruction set (often referred to as x87) among others. The output precision of the x87 floating point multiply instruction (FMUL) is controlled by the PC field of the control register 60. Some other x87 instructions are also controlled by the PC field (e.g. the FADD, FSUB, FDIV, FCOM, and FSQRT instructions). The floating point values stored in the register file 26 at the time a given precision is established in the PC field of the control register 60 may have any precision (e.g. some may have greater precision than the established precision in the PC field). However, as these values are overwritten with results from the above x87 instructions, the precision of the operands may tend to more frequently be of the established precision. Accordingly, in the illustrated embodiment, the prediction circuit 50 may predict that the precision of the operands of a floating point multiply operation may be the precision indicated by the PC field.

For the present embodiment, the prediction circuit 50 may predict that floating point multiply operations are either "fast" or "slow". "Fast" floating point multiply operations may have a lower execution latency than "slow" floating point multiply operations. For the present embodiment, "fast" floating point multiply operations have single or double precision operands and complete with an execution latency that is one clock cycle less than "slow" floating point multiply operations (which have extended precision operands and thus use at least a second pass through the multiplier 56). Other embodiments may have a greater difference in execution latencies between fast and slow floating point multiply operations. The prediction circuit 50 conveys its prediction to the scheduler 28. While the prediction circuit 50 is illustrated as supplying the fast/slow prediction in response to operations received by the prediction circuit 50, the prediction circuit 50 may simply provide a prediction as a decode of the PC field of the control register 60, and the scheduler control circuit 52 may apply the prediction to received floating point multiply operations. In other embodiments, the prediction circuit 50 may generate different opcodes for the fast and slow floating point multiply operations, and such opcodes may be provided to the scheduler 28 (for storage in the scheduler buffer 54 and issue to the FPU 36 for execution). The scheduler 28 may infer the execution latencies from the different opcodes. In general, the prediction circuit 50 may generate any indication of the predicted execution latency.

The scheduler control circuit 52 may be configured to allocate scheduler buffer 54 entries to received operations, deallocate scheduler buffer 54 entries, and schedule operations for execution. Two exemplary entries are illustrated in FIG. 2, although the content of each entry may vary in various embodiments and may include additional, substitute, or alternative content to that shown in FIG. 2. Each scheduler buffer 54 entry may store information related to one operation, and may include a state (State in FIG. 2), the operation (Oper. in FIG. 2), the operand addresses for the register file 26 (Ops. In FIG. 2), and the execution latency of the operation (Lat. in FIG. 2). For floating point multiply operations, the execution latency may be the fast or slow latency, dependent on the prediction from the prediction circuit 50. Generally, the state may track at least whether or not the operation has been issued, and may track progress of the operation through the execution pipeline of the processor 10 as well.

In response to scheduling a particular operation, the scheduler buffer 54 may output the operation to the execution core 34 that executes the operation (e.g. the FPU 36, for floating point operations). Additionally, the scheduler buffer 54 may output the operand addresses to the register file 26 to read the operands for the operation. The register file 26 forwards the addressed operands to the execution core 34 (e.g. the FPU 36, in the illustrated embodiment).

The scheduler 28 and/or other portions of the processor 10 may be dependent on the execution latencies of operations to be correct. For example, in some embodiments, the scheduler 28 may broadcast the tag of a scheduled operation at a predetermined time prior to the operation forwarding a result on the result bus 40. The broadcast may be internal to the scheduler 28 (to other scheduler buffer entries, permitting operations dependent on the operation to be scheduled) and/or external to the scheduler 28 (e.g. to forwarding logic in the execution cores 34, permitting the execution cores 34 that may execute dependent ops to capture forwarded data from the result bus 40). The predetermined time may be dependent on the number of pipeline stages between the scheduler 28 and the execution cores 34, the number of pipeline stages in the execution cores, the forwarding logic implemented in the execution cores, etc. For example, the predetermined period of time may permit scheduling of a dependent operation such that it reaches the register file 26 concurrent with the result reaching the register file 26, or such that it reaches the execution core 34 at the same time as the result is available for forwarding.

Accordingly, if a predicted fast multiply operation is actually a slow multiply operation, the broadcast of the tag may occur too early. If a dependent operation is scheduled, the dependent operation may not receive the result data that is expected for correct operation. Forwarding logic in the execution cores may attempt to capture the data from the result bus 40 before it is provided.

The precision check circuit 58 may receive the operands from the register file 26, and may verify the predicted execution latency against the actual execution latency. For example, in the present embodiment, the precision check circuit 58 may verify that the fast or slow multiply prediction is correct. For the present embodiment, a fast multiply operation occurs if the precision of the operands is not higher than double precision. Thus, the precision check circuit 58 may detect a misprediction if a fast multiply operation is predicted and at least one operand is higher than double precision. The precision check circuit 58 may check, e.g., the least significant 11 bits of the extended precision significand to ensure that they are zero. If a non-zero bit is detected in the least significant 11 bits, and the prediction was a fast multiply operation, a misprediction may be detected. In the illustrated embodiment, the opcode of the operation may indicate fast or slow and thus the precision check circuit 58 may decode the opcode to detect that the prediction was a fast multiply. In other embodiments, a separate signal or signals may indicate the predicted execution latency and the precision check circuit 58 may receive the signal(s) instead of (or in addition to) the opcode of the operation. In some embodiments, the precision check circuit 58 may also detect a misprediction for a predicted slow multiply operation which is actually a fast multiply operation.

In various embodiments, the detection of a misprediction by the precision check circuit 58 may be handled in a variety of fashions. For example, in the illustrated embodiment, the precision check circuit 58 may output an exception signal to the retire queue 12 (or other circuitry for handling the misprediction). In response to the exception, the original floating point multiply instruction (and subsequent instructions) may be refetched from the instruction cache 16. The scheduler 28 may discard the floating point multiply operation and operations subsequent to the floating point multiply operation in program order, and await the refetched operations. During the refetch, the instruction cache 16 predicts that the floating point multiply operation is a slow multiply operation. In another embodiment, a microcode routine may be invoked in response to the exception. The microcode routine may supply a slow floating point multiply operation, and may cause a refetch of the next instruction.

In another embodiment, instead of signaling an exception, the precision check circuit 58 may be configured to signal the misprediction to the scheduler control circuit 52. The scheduler control circuit 52 may handle the misprediction in a variety of ways. For example, the scheduler control circuit 52 may reset the state of the floating point multiply operation to "not issued", and thus the floating point multiply operation may be rescheduled again. Additionally, the scheduler control circuit 52 may change the execution latency of the operation to the slow multiply operation (and the opcode, in embodiments in which the opcode indicates the execution latency). If dependent operations have been scheduled, they may be reissued as well (after resetting their state). In some embodiments, the scheduler control circuit 52 may reissue all operations which are subsequent to the multiply operation in program order. In another embodiment, a predicted slow multiply operation may be detected to be a fast multiply operation prior to the scheduling of dependent operations (or the broadcast of the tag, as described above), the scheduler control circuit 52 may delay the scheduling or the tag broadcast until the difference between the slow execution latency and the fast execution latency has expired. Alternatively, the predicted slow multiply operation that is actually a fast multiply operation may be reissued as a fast multiply operation (along with any dependent operations, as described above).

As used herein with regard to mispredicted execution latencies, the term exception refers to the processor ceasing execution of the operation on which the exception is signaled and discarding subsequent operations. The processor may refetch the operation, or may begin fetching an exception handler (e.g. from microcode). The exception may not, in some embodiments, be visible to software. Such exceptions are sometimes referred to as microarchitectural exceptions or faults.

It is noted that, in some embodiments, the multiplier 56 may have a design in which a portion of the multiplier is replicated and the portion is clocked at ½ the frequency of the processor 10. On alternate clocks, alternate ones of the replicated portions are selected for the multiplications being performed (thus maintaining one multiply/clock cycle throughput). The replicated portions are clocked 180 degrees out of phase with each other. For example, in one embodiment, the multiplier may be a Booth-3 implementation. In such an implementation, at least the compression tree for the compression of partial products may be duplicated and operated at the ½ frequency. The partial product generation may also be duplicated and operated at the ½ frequency.

In other embodiments, the multiplier 56 may be designed to multiply a double precision operand and a single precision operand, two single precision operands, etc. An extended precision multiplication on a single precision multiplier may be completed in nine passes, and a double precision multiplication may be completed in four passes. Thus, in some embodiments, the predicted execution latency may be selected from multiple execution latencies.

Other embodiments may implement other hardware designed for less than the maximum precision, and multiple passes may be used for operands having a higher precision than the implemented precision. The execution latencies of such operations may be predicted, verified during execution, and misprediction recovery may occur similar to the above description for the floating point multiply operation. For example, an adder may be implemented for double precision operands, and extended precision operands may use two passes through the adder to complete the addition of the extended precision significands. For such embodiments, the execution latency of the floating point add operation (and floating point subtract operation) may be predicted similar to the above discussion. If a misprediction is detected, corrective action may be taken to recover from the misprediction, similar to the above description.

The embodiment illustrated in FIG. 2 provides the PC field from the control register 60 to the prediction circuit 50. Other embodiments may include a speculative PC field (or control register 60), and the prediction circuit 50 may be coupled to receive the speculative PC field for predicting the execution latency.

While the embodiment of FIG. 2 predicts the execution latency of the floating point multiply operations as the operations are provided to the scheduler 28, other embodiments may predict the execution latency at other points. For example, FIG. 3 is a block diagram of one embodiment of the dispatch unit 14 in greater detail (along with the instruction cache 16). In the illustrated embodiment, the dispatch unit 14 includes a trace build circuit 70 (which may itself include the prediction circuit 50), a trace cache 72, a multiplexor (mux) 74, and the register map 44. The instruction cache 16 and the trace cache 72 may be coupled in parallel to receive a fetch address for fetching instructions. The instruction cache 16 may output one or more instructions to the trace build circuit 70 and to the mux 74. Similarly, the trace cache 72 may output a trace of instructions to the mux 74 in response to the fetch address, as well as a hit indication. The trace build circuit 70 is coupled to receive a retire indication from the retire queue 12 and is coupled to the trace cache 72. The prediction circuit 50 is coupled to receive the PC field from the control register 60 (or a speculative copy thereof). The output of the mux 74 is coupled to the register map 44, which outputs the instructions (and mapped register addresses, which may be the operand addresses described above with regard to FIG. 2) to the scheduler 28.

The trace cache 72 may store traces of operations previously executed by the processor 10. The traces may include one or more branch operations, along with operations executed (in program order) subsequent to the branch operations (e.g. at the target address or the sequential address, depending on whether or not the branch operations were taken). Generally, the fetch address may access the trace cache 72 and the instruction cache 16 in parallel. If there is a hit in the trace cache, the mux 74 selects the trace output by the trace cache. Otherwise, the output of the instruction cache 16 is selected. If there is a miss in both the instruction cache 16 and the trace cache 70, instruction dispatch may stall until the missing cache line is stored into the instruction cache 16.

Traces may be built in a variety of fashions. For example, traces may be built speculatively, using branch prediction data and other speculative mechanisms to "guess" what the traces will be. The traces may be updated in response to detecting incorrect speculation. In the illustrated embodiment, the instructions fetched from the instruction cache 16 may be buffered by the trace build circuit 70, and the traces may be built in response to retirement of the instructions. The retire queue 12 may provide a retire indication indicating which instructions dispatched by the dispatch unit 14 were retired and which were not, and thus the trace may be built from the instructions actually retired by the processor 10. The prediction circuit 50 may be used to predict floating point multiply operations (based on the PC field) in response to retirement of the floating point multiply operations. In other embodiments, the prediction may be based on the operands during the first execution of the floating point multiply operation. The retire indication from the retire queue 12 may indicate the precision of the operands for floating point multiply operations. The trace may include one of at least two multiply operations (e.g. identified by different opcodes), depending on the predicted precision. Alternatively, the trace cache may store an indication of the prediction and the prediction may be used when the floating point multiply operation is fetched from the trace cache 72. Once a trace is built, the trace build circuit 70 may update the trace cache 72 with the trace and the address of the first instruction in the trace.

Accordingly, floating point multiply operations fetched from the trace cache 72 may have a fast or slow prediction. The prediction may be used by the scheduler 28, similar to using the output of the prediction circuit 50 as shown in FIG. 2. For such embodiments, the prediction circuit 50 in FIG.

2 may not be included. Floating point multiply instructions fetched from the instruction cache 16 may not have a predicted execution latency. Such instructions may be assumed to be slow multiply operations. In other embodiments, floating point multiply instructions fetched from the instruction cache 16 may be predicted also, unless the floating point multiply instruction is being refetched in response to a misprediction.

It is noted that, for embodiments employing the trace cache 72 and storing the predicted execution latency in the trace cache 72 (e.g. via different opcodes, in some embodiments), it may also be desirable to detect when a slow multiply operation is predicted and the multiply operation is fast. In such embodiments, the trace may be updated in the trace cache 72 to predict a fast multiply operation.

Figure 3:
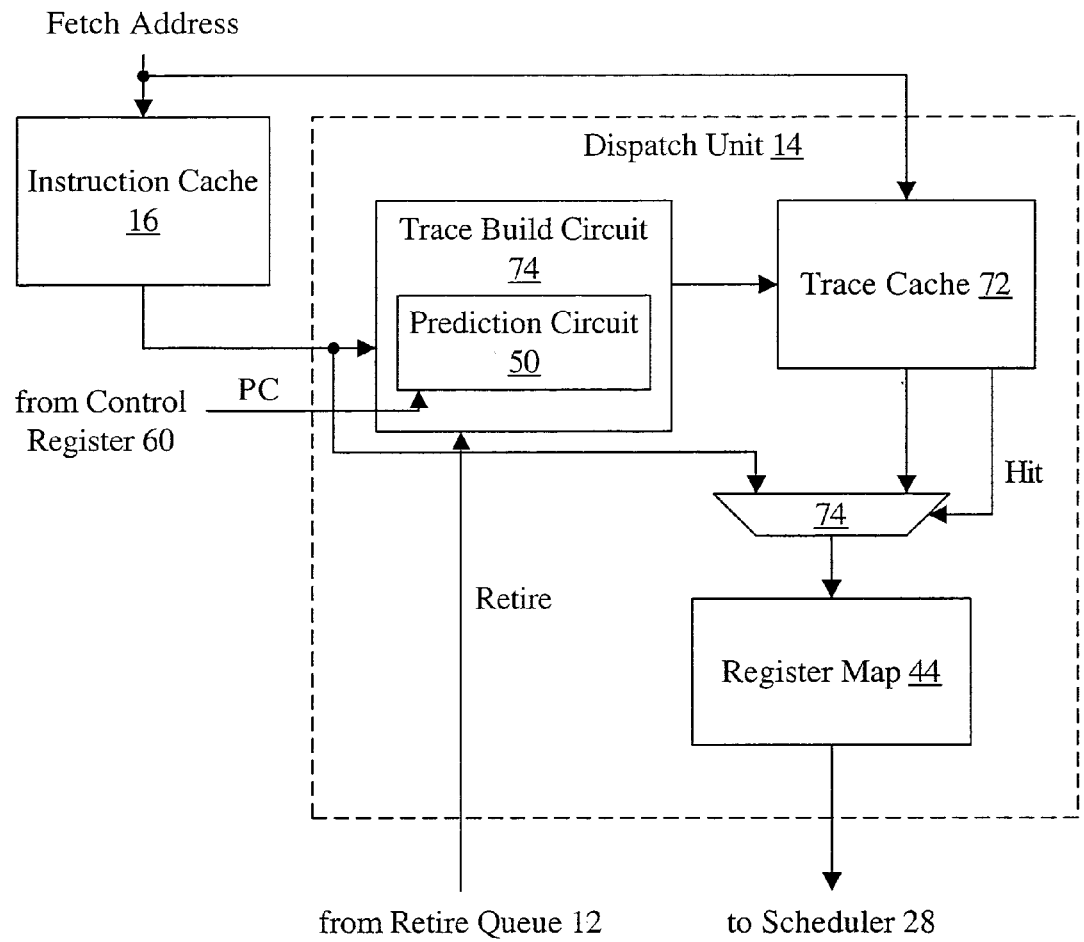
FIG. 3 is a block diagram of a second portion of one embodiment of the processor in more detail.

In other embodiments, the dispatch unit 14 similar to that shown in FIG. 3 may be used, except that the prediction circuit 50 may not be included. Instead, the prediction circuit 50 may operate on instructions being provided to the scheduler 28, similar to the embodiment of FIG. 2.

While some embodiments of FIG. 3 may cache an indication of the predicted execution latency in the trace cache 72, other embodiments may not include a trace cache. Such embodiments may cache an indication of the prediction in other fashions. For example, some instruction caches include predecode data for the instructions. The predecode data may include an indication of the prediction.

Figure 4:
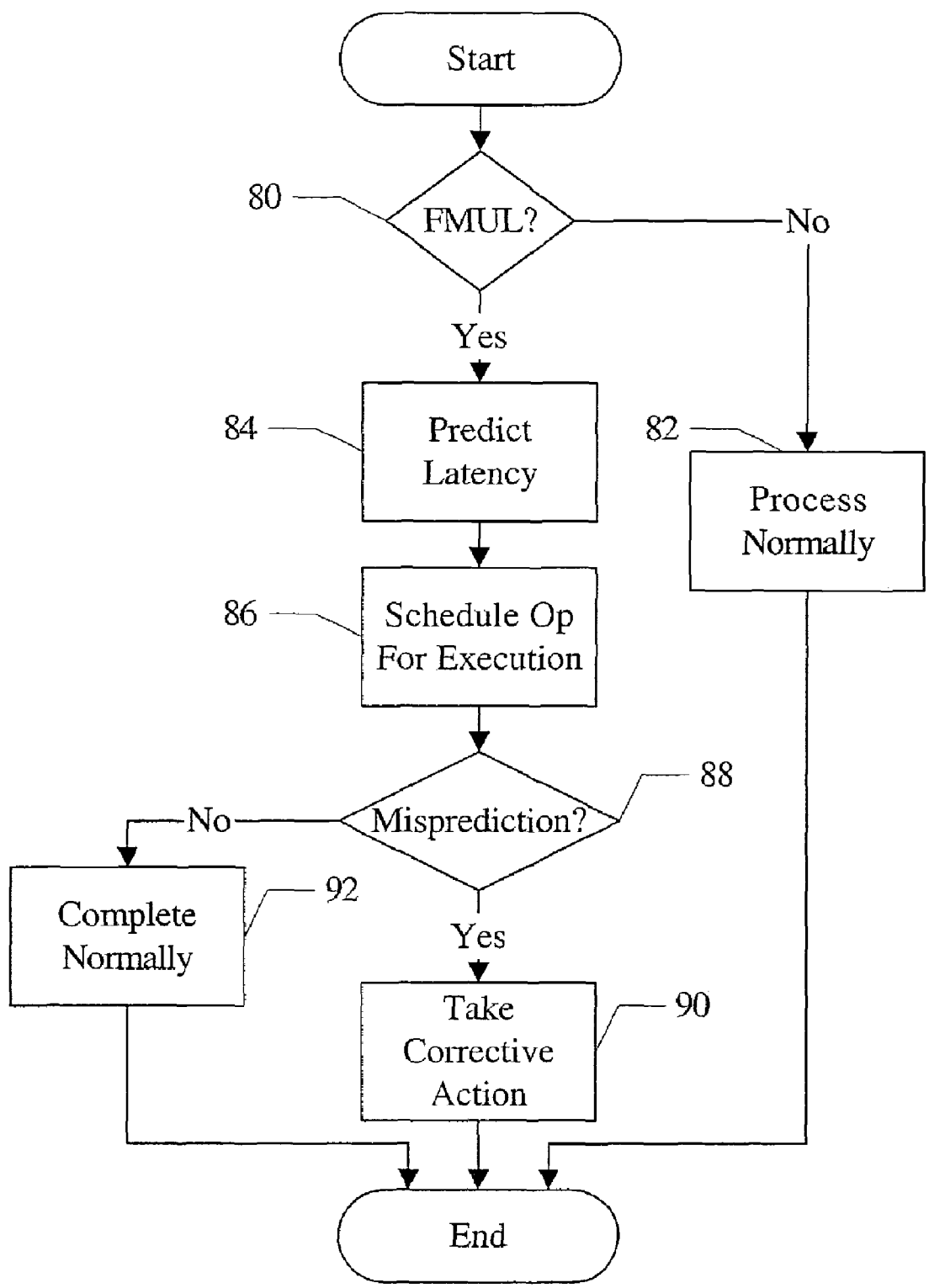
FIG. 4 is a flowchart illustrating operation of one embodiment of the processor for a floating point operation.

Turning next to FIG. 4, a flowchart is shown illustrating operation of one embodiment of the processor 10 for processing an instruction. The flowchart may also be viewed as illustrating a method of handling floating point instructions that may have a variable execution latency. The blocks shown are illustrated in a particular order for ease of understanding, but other orders may be used. Blocks may illustrate operation of combinatorial logic circuitry, and thus may be performed in parallel by the processor 10. Blocks may also be pipelined over multiple clock cycles, as desired. The flowchart illustrated in FIG. 4 predicts execution latencies for floating point multiply operations (e.g. an operation resulting from the FMUL instruction). Other embodiments may implement a similar flowchart/method for any floating point operation that may have a variable execution latency.

If an instruction to be processed is not a floating point multiply instruction (e.g. FMUL) (decision block 80—"no" leg), the instruction is processed normally (block 82). If the instruction is an FMUL instruction (decision block 80—"yes" leg), the processor 10 predicts the execution latency (block 84). The floating point multiply operation may be scheduled for execution (block 86). During execution, the processor 10 may determine if the execution latency is mispredicted (decision block 88). If the execution latency is mispredicted (decision block 88—"yes" leg), the processor 10 may take corrective action (block 90). For example, the processor may take an exception, reschedule the floating point multiply operation, etc. If the execution latency is predicted correctly (decision block 88—"no" leg), the floating point multiply operation is completed normally (block 92).

Block 84 may represent the operation, for example, of the prediction circuit 50 at any point in the pipeline of the processor 10. Block 86 may represent operation of the scheduler 28, for example. The decision block 88 may represent operation of the precision check circuit 58, in some embodiments.

Computer Systems

Figure 5:
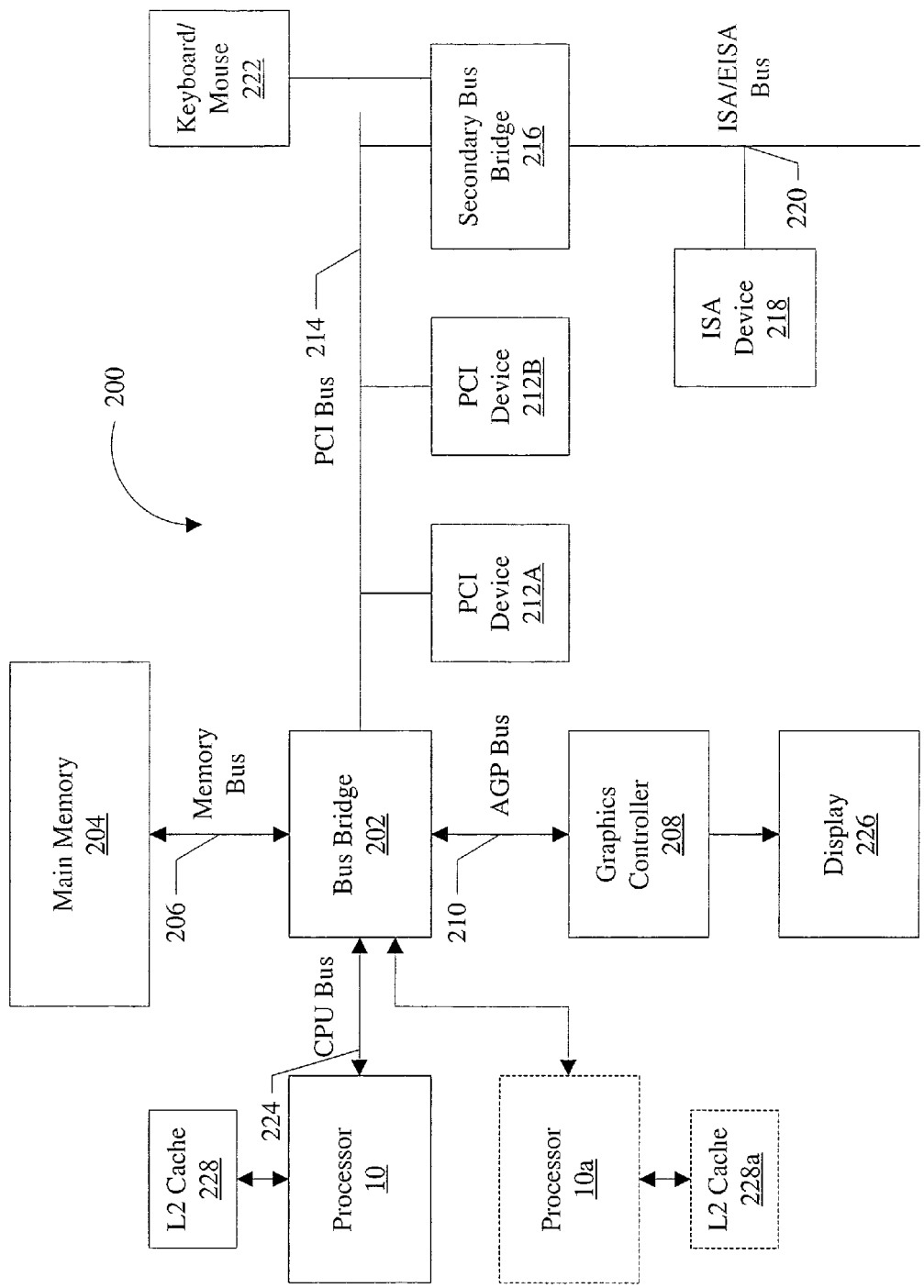
FIG. 5 is a block diagram of one embodiment of a computer system including one or more of the processors shown in FIG. 1.

Turning now to FIG. 5, a block diagram of one embodiment of a computer system 200 including processor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A-212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple. The processor 10 may be the processor 10 shown in FIG. 1, and may include the details shown in FIGS. 2 and/or 3.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM), double data rate (DDR) SDRAM, or Rambus DRAM (RDRAM) may be suitable. Main memory 204 may include the system memory 42 shown in FIG. 1.

PCI devices 212A-212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10*a* shown as an optional component of computer system 200). Processor 10*a* may be similar to processor 10. More particularly, processor 10*a* may be an identical copy of processor 10. Processor 10*a* may be connected to bus bridge 202 via an independent bus (as shown in FIG. 5) or may share CPU bus 224 with processor 10. Furthermore, processor 10*a* may be coupled to an optional L2 cache 228*a* similar to L2 cache 228.

Figure 6:
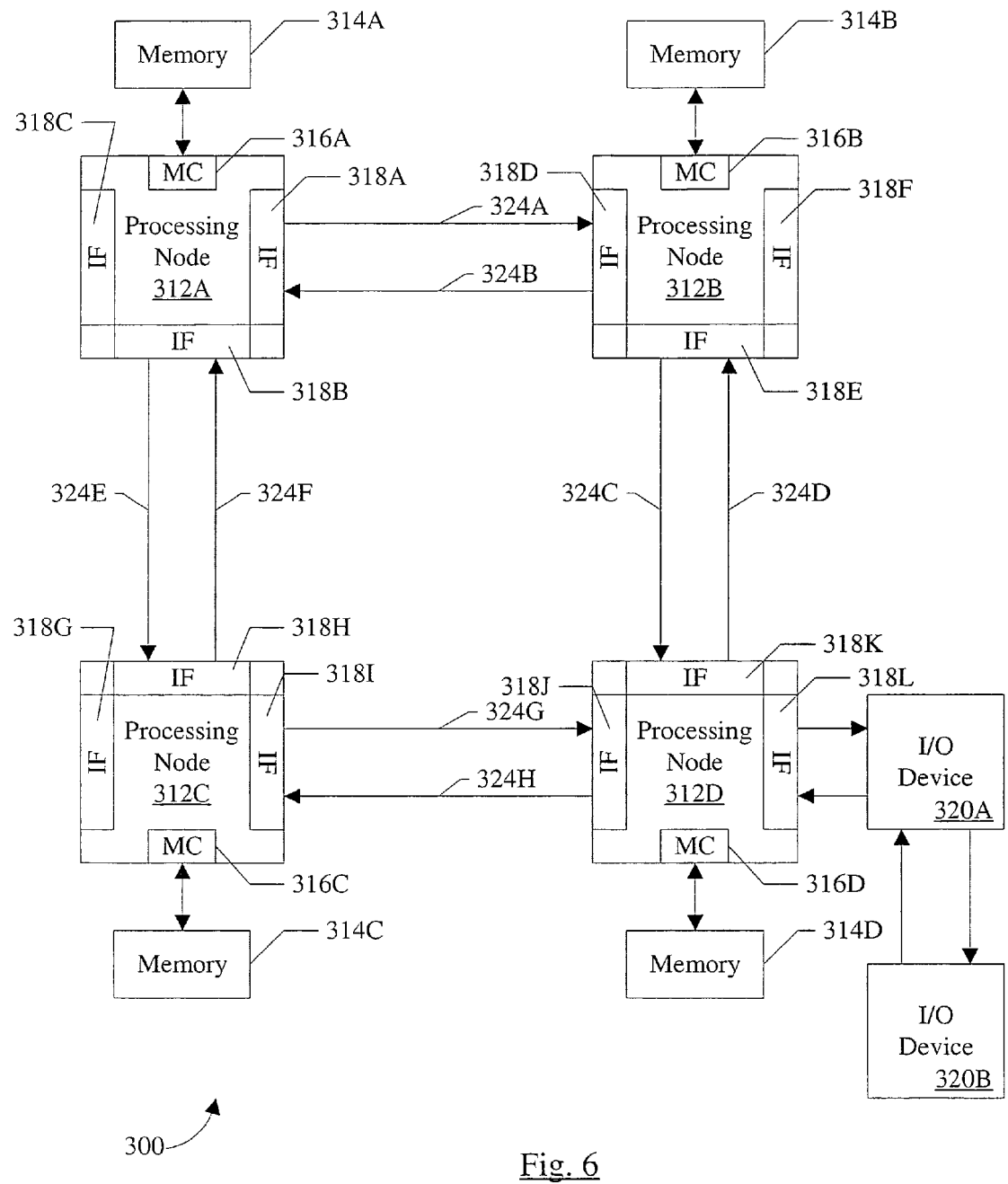
FIG. 6 is a block diagram of a second embodiment of a computer system including one or more of the processor shown in FIG. 1.

Turning now to FIG. 6, another embodiment of a computer system 300 is shown. In the embodiment of FIG. 6, computer system 300 includes several processing nodes 312A, 312B, 312C, and 312D. Each processing node is coupled to a respective memory 314A-314D via a memory controller 316A-316D included within each respective processing node 312A-312D. Additionally, processing nodes 312A-312D include interface logic used to communicate between the processing nodes 312A-312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A-320B in a daisy chain configuration) via interface logic 318L. Other processing nodes may communicate with other I/O devices in a similar fashion.

Processing nodes 312A-312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C-324H are used to transmit packets between other processing nodes as illustrated in FIG. 6. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 6. Any suitable routing algorithm may be used. Other embodiments of computer system 300 may include more or fewer processing nodes then the embodiment shown in FIG. 6.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A-312D, in addition to a memory controller and interface logic, may include one or more processors. Broadly speaking, a processing node comprises at least one processor and may optionally include a memory controller for communicating with a memory and other logic as desired. More particularly, each processing node 312A-312D may comprise one or more copies of processor 10 as shown in FIG. 1 (e.g. including various details shown in FIGS. 2 and 3). External interface unit 18 may includes the interface logic 318 within the node, as well as the memory controller 316.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface logic 318A-318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A processor comprising:
    a prediction circuit configured to predict an execution latency of a floating point operation responsive to a predicted precision of the floating point operation;
    a register file;
    a scheduler coupled to the register file and configured to schedule the floating point operation for execution, wherein the scheduler is configured to transmit one or more register addresses of operands of the floating point operation to the register file responsive to scheduling the floating point operation for execution, and wherein the prediction circuit is configured to predict the execution latency prior to the floating point operation being scheduled by the scheduler for execution; and
    a floating point unit coupled to receive the floating point operation scheduled by the scheduler for execution and one or more operands read from the register file in response to the one or more register addresses received by the register file from the scheduler, wherein the floating point unit is configured to detect a misprediction of the execution latency.

2. The processor as recited in claim 1 wherein the predicted precision is a prediction of a precision of the operands of the floating point operation.

3. The processor as recited in claim 2 wherein the floating point unit comprises a control register storing a precision control indication indicative of an output precision for the floating point operation, wherein the predicted precision is the output precision.

4. The processor as recited in claim 2 wherein the floating point operation is a multiply operation, and wherein the floating point unit comprises a multiplier designed for a first precision less than a maximum precision supported by the processor, and wherein the execution latency is based on a number of passes through the multiplier used to complete a multiplication of the precision of the operands.

5. The processor as recited in claim 2 wherein the floating point unit comprises a precision check circuit coupled to receive the operands of the floating point operation, wherein the precision check circuit is configured to detect the misprediction if at least one of the operands of the floating point operation has a precision that exceeds the predicted precision.

6. The processor as recited in claim 1 wherein the floating point unit is configured to signal the scheduler responsive to detecting the misprediction.

7. The processor as recited in claim 6 wherein the scheduler is configured to reschedule the floating point operation responsive to the signaling from the floating point unit with the execution latency indicated as a latency detected by the floating point unit.

8. The processor as recited in claim 6 wherein the prediction circuit is configured to predict the execution latency of the floating point operation responsive to dispatch of the floating point operation to the scheduler.

9. The processor as recited in claim 6 further comprising a trace cache configured to store predicted operation traces, wherein the prediction circuit is configured to predict the execution latency responsive to the floating point operation being included in a trace, and wherein the trace cache is configured to store an indication of the execution latency predicted by the prediction circuit.

10. The processor as recited in claim 9 wherein the trace cache is configured to store a selected opcode of at least two opcodes for the floating point operation responsive to the execution latency predicted by the prediction circuit, the selected opcode comprising the indication of the execution latency.

11. The processor as recited in claim 1 wherein the floating point unit is configured to signal an exception responsive to detecting the misprediction.

12. The processor as recited in claim 11 wherein the processor is configured to refetch the floating point operation responsive to the exception.

13. The processor as recited in claim 1 wherein the floating point unit is configured to detect the misprediction responsive to detecting an actual execution latency greater than the execution latency predicted by the prediction circuit.

14. The processor as recited in claim 13 wherein the floating point unit is configured not to detect the misprediction responsive to detecting the actual execution latency is less than the execution latency predicted by the prediction circuit.

15. The processor as recited in claim 13 wherein the floating point unit is further configured to detect the misprediction responsive to detecting the actual execution latency is less than the execution latency predicted by the prediction circuit.

16. A method comprising:
    predicting an execution latency of a floating point operation responsive to a predicted precision of the floating point operation;
    scheduling the floating point operation from a scheduler for execution in a floating point unit, wherein scheduling the floating point operation comprises transmitting one or more register addresses of operands of the floating point operation to a register file to read one or more operands of the floating point operation, and wherein the predicting is performed prior to the scheduling; and
    the floating point unit detecting a misprediction of the execution latency.

17. The method as recited in claim 16 wherein the predicted precision is a prediction of a precision of the operands of the floating point operation.

18. The method as recited in claim 17 wherein the floating point operation is a multiply operation, and wherein the floating point unit comprises a multiplier designed for a first precision less than a maximum precision supported by the processor, and wherein the execution latency is based on a number of passes through the multiplier used to complete a multiplication of the precision of the operands.

19. The method as recited in claim 17 wherein detecting the misprediction comprises detecting that at least one of the operands of the floating point operation has a precision that exceeds the predicted precision.

20. The method as recited in claim 16 further comprising rescheduling the floating point operation responsive to detecting the misprediction, with the execution latency indicated as a latency detected by the floating point unit.

21. The method as recited in claim 16 further comprising:
 signaling an exception responsive to detecting the misprediction; and
 refetching the floating point operation responsive to the exception.

22. The method as recited in claim 16 wherein detecting the misprediction comprises detecting an actual execution latency greater than the execution latency predicted in the predicting.

23. The method as recited in claim 22 further comprising not detecting the misprediction responsive to detecting the actual execution latency is less than the execution latency predicted in the predicting.

24. The method as recited in claim 22 further comprising detecting the misprediction responsive to detecting the actual execution latency is less than the execution latency predicted in the predicting.

* * * * *